:::

United States Patent
Kim et al.

(10) Patent No.: US 10,910,661 B2
(45) Date of Patent: Feb. 2, 2021

(54) METHOD OF MANUFACTURING PLANAR MEMBRANE ELECTRODE ASSEMBLY FOR FUEL CELL AND PLANAR MEMBRANE ELECTRODE ASSEMBLY FOR FUEL CELL MANUFACTURED USING THE SAME

(71) Applicants: Hyundai Motor Company, Seoul (KR); Kia Motors Corporation, Seoul (KR)

(72) Inventors: Min Jin Kim, Seoul (KR); Woo Jin Lee, Seoul (KR); Yong Min Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 134 days.

(21) Appl. No.: 16/206,712

(22) Filed: Nov. 30, 2018

(65) Prior Publication Data
US 2020/0036025 A1 Jan. 30, 2020

(30) Foreign Application Priority Data

Jul. 30, 2018 (KR) .......................... 10-2018-0088350

(51) Int. Cl.
*H01M 8/1004* (2016.01)
*H01M 8/1032* (2016.01)
(Continued)

(52) U.S. Cl.
CPC ....... *H01M 8/1004* (2013.01); *H01M 8/1032* (2013.01); *H01M 8/1039* (2013.01);
(Continued)

(58) Field of Classification Search
CPC .................... H01M 8/1004; H01M 2300/0082
See application file for complete search history.

(56) References Cited

U.S. PATENT DOCUMENTS 6,312,846 B1 * 11/2001 Marsh ................... B82Y 30/00
429/430
2005/0164072 A1 7/2005 Yan et al.
(Continued)

FOREIGN PATENT DOCUMENTS

CN 103348520 A 10/2013
DE 102013205284 A1 10/2013
(Continued)

*Primary Examiner* — Olatunji A Godo
(74) *Attorney, Agent, or Firm* — Mintz Levin Cohn Ferris Glovsky and Popeo; Peter F. Corless

(57) ABSTRACT

Disclosed are a method of manufacturing a membrane electrode assembly for a fuel cell and a membrane electrode assembly for a fuel cell manufactured using the same. The planar membrane electrode assembly for a fuel cell may include an ionomer membrane formed on both side surfaces of an electrode and between the electrode and an electrolyte membrane, thereby increasing interfacial bonding force between the electrode and the electrolyte membrane and improving the durability of a cell. In addition, the membrane electrode assembly may include planar or smooth surfaces such that formation of voids or surface steps between the electrode and a sub-gasket may be prevented, thereby improving airtightness and preventing deterioration attributable to concentration of pressure.

20 Claims, 6 Drawing Sheets

(51) Int. Cl.
*H01M 8/1039* (2016.01)
*H01M 8/1067* (2016.01)
*H01M 8/1069* (2016.01)

(52) U.S. Cl.
CPC ....... *H01M 8/1067* (2013.01); *H01M 8/1069* (2013.01); *H01M 2300/0082* (2013.01)

(56) References Cited

U.S. PATENT DOCUMENTS

| | | | |
|---|---|---|---|
| 2007/0026295 A1* | 2/2007 | Angell | H01M 8/144 429/498 |
| 2008/0118802 A1 | 5/2008 | Szrama et al. | |
| 2009/0233148 A1 | 9/2009 | Kim et al. | |
| 2009/0246592 A1* | 10/2009 | Kinoshita | H01M 8/1023 429/483 |
| 2013/0252134 A1 | 9/2013 | Takami et al. | |
| 2018/0366745 A1 | 12/2018 | Kim et al. | |

FOREIGN PATENT DOCUMENTS

| | | |
|---|---|---|
| JP | 2011-028852 A | 2/2011 |
| JP | 2014-154350 A | 8/2014 |
| KR | 2003-0073763 A | 9/2003 |
| KR | 10-1483124 B1 | 1/2015 |

* cited by examiner

[ PRIOR ART ]

METHOD OF MANUFACTURING PLANAR MEMBRANE ELECTRODE ASSEMBLY FOR FUEL CELL AND PLANAR MEMBRANE ELECTRODE ASSEMBLY FOR FUEL CELL MANUFACTURED USING THE SAME

CROSS-REFERENCE TO RELATED APPLICATION

This application claims under 35 U.S.C. § 119(a) the benefit of priority to Korean Patent Application No. 10-2018-0088350 filed on Jul. 30, 2018, the entire contents of which are incorporated herein by reference.

TECHNICAL FIELD

The present invention relates to a method of manufacturing a membrane electrode assembly, or a planar membrane electrode assembly, for a fuel cell and a membrane electrode assembly for a fuel cell manufactured using the same. The membrane electrode assembly may include an ionomer membrane formed on both side surfaces of an electrode and between the electrode and an electrolyte membrane, thereby increasing interfacial bonding force between the electrode and the electrolyte membrane, improving airtightness, and preventing deterioration attributable to pressure concentration.

BACKGROUND

A fuel cell has been used to directly convert chemical energy generated by oxidation of fuel into electric energy, for example, through electrochemical reaction within a stack without converting the chemical energy into heat by combustion.

A membrane electrode assembly (MEA) may be used for a fuel cell. In the related art, typical membrane electrode assembly includes a polymer electrolyte membrane, for transporting hydrogen cations, and a cathode (air electrode) layer and an anode (fuel electrode) layer, which are coated on both surfaces of the electrolyte membrane so that hydrogen and oxygen can react with each other.

FIG. 1 shows a conventional process of manufacturing a conventional membrane electrode assembly. For example, each of electrodes 12, which include an anode and a cathode, is coated on a corresponding release paper 11. The anode and the cathode, each of which is coated on the corresponding release paper 11, are placed on both surfaces of an electrolyte membrane 13, and are then thermally bonded by a press machine. Subsequently, the release paper 11 adhered to each of the anode and the cathode is removed, and consequently a membrane electrode assembly, in which the anode and the cathode are bonded to both surfaces of the electrolyte membrane 13, is formed. Moreover, in order to protect and handle the membrane electrode assembly, a sub-gasket 14 is thermally bonded to each of both surfaces of the membrane electrode assembly. At this time, the sub-gasket 14 must also be bonded to a portion of the electrode 12 so that the electrolyte membrane 13 or the boundary between the electrode 12 and the electrolyte membrane 13 is not exposed.

However, as shown in FIG. 1, when the sub-gasket 14 is bonded to the membrane electrode assembly, a void 15, through which the boundary between the electrode 12 and the electrolyte membrane 13 is exposed, is generally formed. Further, the edge portion of the electrode 12 to which the sub-gasket 14 is bonded is locally pressed by the sub-gasket 14. When this local concentration of pressure occurs in the state in which the void 15 is formed, deterioration occurs, and the durability of the membrane electrode assembly is greatly lowered. In addition, the void 15 may cause a problem of deterioration in airtightness or deformation of the shape of the membrane electrode assembly. In addition, the sub-gasket 14, which is bonded over a portion of the electrode 12 of the membrane electrode assembly, is about twice as thick as the membrane electrode assembly, leading to the formation of a locally high-stepped portion. Since hundreds of membrane electrode assemblies are stacked when used, the locally high-stepped portions are also stacked on one another, which may cause malfunction of the system or may accelerate physical deterioration.

In addition, a conventional membrane electrode assembly is manufactured in a manner such that a solid electrode is bonded to a solid electrolyte membrane through a thermo-compression bonding method. However, the bonding area between the electrode and the electrolyte membrane is small, and thus the interfacial bonding force therebetween is decreased, leading to deterioration in the durability of the cell.

The above information disclosed in this Background section is only for enhancement of understanding of the background of the invention, and therefore it may contain information that does not form the prior art that is already known in this country to a person of ordinary skill in the art.

SUMMARY OF THE INVENTION

In preferred aspects, provided are, inter alia, a method of manufacturing a membrane electrode assembly (or "planar membrane electrode assembly") for a fuel cell. The membrane electrode assembly may include an ionomer membrane formed on both side surfaces (e.g., first and second sides) of an electrode and between the electrode and an electrolyte membrane. Accordingly, the formation of voids may be prevented, surface steps between the electrode and a sub-gasket may be eliminated, and airtightness may be improved. In addition, deterioration attributable to pressure concentration may be prevented.

The "planar", "planar-shape", or "planar shaped structure" as used herein refers to a surficial feature having substantial smoothness, flatness, and continuity without substructural disturbance such as protrusions, collapses, crevices, dents or discontinuous textures.

Thus, a membrane electrode assembly for a fuel cell, in which interfacial bonding force between an electrode and an electrolyte membrane may be increased, may be provided.

In one aspect, provided is a method of manufacturing a membrane electrode assembly for a fuel cell. The membrane electrode assembly may have planar surfaces The method may include forming a plurality of electrodes on a substrate so as to be spaced apart from each other at a predetermined interval, preparing one or more electrode composites, each of the electrode composites comprising an ionomer membrane formed on the substrate and the plurality of the electrodes so as to fill a space between the electrodes and to cover the electrodes, stacking and bonding the one or more electrode composites on a first surface and a second surface of an electrolyte membrane so that the electrolyte membrane and the ionomer membrane of the each of the electrode composites contact each other, preparing a membrane electrode assembly by removing the substrate, and bonding a sub-gasket to the first and second surfaces of the membrane electrode assembly so as to cover edges of the electrodes and the ionomer membrane.

The "ionomer membrane" preferably include ionomer as a main component. The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. In certain aspect, the ionomer may suitably include ionic groups involved in electron and/or proton transfer in an electrolyte of a membrane electrode assembly or a fuel cell.

Preferably, the one or more electrode composites may include a first electrode composite and a second electrode composite. In the stacking and the bonding, a first surface of the electrolyte membrane may be bonded to the first electrode composite so that the ionomer membrane of the first electrode composite and the first surface of the electrolyte membrane contact each other and a second surface of the electrolyte membrane may be bonded to the second electrode so that the ionomer membrane of the second electrode composite and the second surface of the electrolyte membrane contact each other. The first surface of the electrolyte membrane and the second surface of the electrolyte membrane may be opposing surfaces.

For example, the method of manufacturing a membrane electrode assembly for a fuel cell may include forming a plurality of electrodes on a substrate so as to be spaced apart from each other at a predetermined interval, preparing a first electrode composite and a second electrode composite, each of which may include an ionomer membrane on the substrate and the plurality of electrodes so as to fill a space between the electrodes and to cover the electrodes, bonding a first surface of an electrolyte membrane to the first electrode composite so that the ionomer membrane of the first electrode composite and the first surface of the electrolyte membrane contact each other, stacking and bonding the second electrode composite onto a second surface of the electrolyte membrane so that the ionomer membrane of the second electrode composite and the second surface of the electrolyte membrane contact each other, preparing a membrane electrode assembly by removing the substrate, and bonding a sub-gasket to the first and second surfaces of the membrane electrode assembly so as to cover edges of the electrodes and the ionomer membrane.

The substrate may suitably include one or more selected from the group consisting of polyethylene terephthalate, polyethylene naphthalate, and polyimide.

The stacking and bonding, the one or more electrode composite may be bonded to the electrolyte membrane by performing thermocompression bonding using a roll press machine heated to a temperature of about 80 to 120° C.

Likewise, in the stacking and bonding, the second electrode composite may be bonded to the electrolyte membrane by performing thermocompression bonding using a roll press machine heated to a temperature of about 80 to 120° C.

The electrodes of the membrane electrode assembly may include an anode and a cathode. Preferably, the anode and the cathode may be disposed on the different electrode composites such that the electrolyte membrane may be interposed between the anode and the cathode. The anode may have a thickness of about 1 to 5 µm, and the cathode may have a thickness of about 5 to 15 µm.

The ionomer membrane may be formed by applying an ionomer solution onto the substrate. Preferably, the ionomer solution may have a solid content of about 10 to 50% by weight and a viscosity of about 10 to 50 cP at a temperature of about 25° C.

The ionomer solution may suitably include a perfluorinated sulfonic acid polymer and an organic solvent.

The ionomer membrane may be formed by applying an ionomer solution onto the substrate, drying the ionomer solution at a temperature of about 80° C. for about 5 to 30 minutes, and thermally treating the ionomer solution at a temperature of about 160° C. for about 5 to 30 minutes.

Preferably, the ionomer membrane formed on the electrodes may suitably have a thickness greater than a thickness of each of the plurality of the electrodes.

Preferably, the ionomer membrane formed at the anode may suitably have a thickness of about 2 to 8 µm, and the ionomer membrane formed at the cathode may suitably have a thickness of about 6 to 18 µm.

Preferably, the electrolyte membrane may include a reinforcing layer. Additionally, the electrolyte membrane may suitably include a reinforcing layer and an ionomer impregnated in the reinforcing layer. Alternatively, the electrolyte membrane may be a reinforcing layer.

Preferably, the reinforcing layer may suitably include expanded polytetrafluoroethylene (e-PTFE).

The term "expanded polytetrafluoroethylene" or "e-PTFE" is meant by a polytetrafluoroethylene polymer product that may contain microporous fibrous structures such that it may have reinforcing strength in a certain or random direction. Typical e-PTFE may be stretchable or flexible, and may allow passage of fluids (e.g., gas or liquid) that may be impregnated inside the structure.

Preferably, after the substrate is removed, each of surfaces of the membrane electrode assembly may have a planar-shaped structure by embedding the plurality of electrodes and filling the space between the plurality of the electrodes with the ionomer membrane.

In another aspect, provided is a membrane electrode assembly for a fuel cell. The membrane electrode assembly may include: an anode composite including i) an anode, a first ionomer membrane interposed between the anode and an electrolyte membrane and having a surface area greater than a surface area of the anode, and a second ionomer membrane located in the same layer as the anode and filling a space formed by the anode and the first ionomer membrane; ii) a cathode composite including a cathode, a third ionomer membrane interposed between the cathode and the electrolyte membrane and having a surface area greater than a surface area of the cathode, and a fourth ionomer membrane located in the same layer as the cathode and filling a space formed by the cathode and the third ionomer membrane; and iii) a gasket bonded to an edge of the anode, the second ionomer membrane, an edge of the cathode, and the fourth ionomer membrane. In particular, the electrolyte membrane may be interposed between the anode composite and the cathode composite.

The electrolyte membrane may suitably include a reinforcing layer, which may be optionally impregnated with an ionomer. For instance, the electrolyte membrane may include a reinforcing layer and an ionomer impregnated in the reinforcing layer.

Preferably, the reinforcing layer may have a thickness of about 1 to 5 µm. Preferably, the anode may have a thickness of about 1 to 5 µm, and the cathode may have a thickness of about 5 to 15 µm.

Preferably, each of the first ionomer membrane and the third ionomer membrane may have a thickness of about 1 to 3 µm.

Further provided is a fuel cell that may include the membrane electrode assembly as described herein.

Still further provided is a vehicle that may include the fuel cell as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
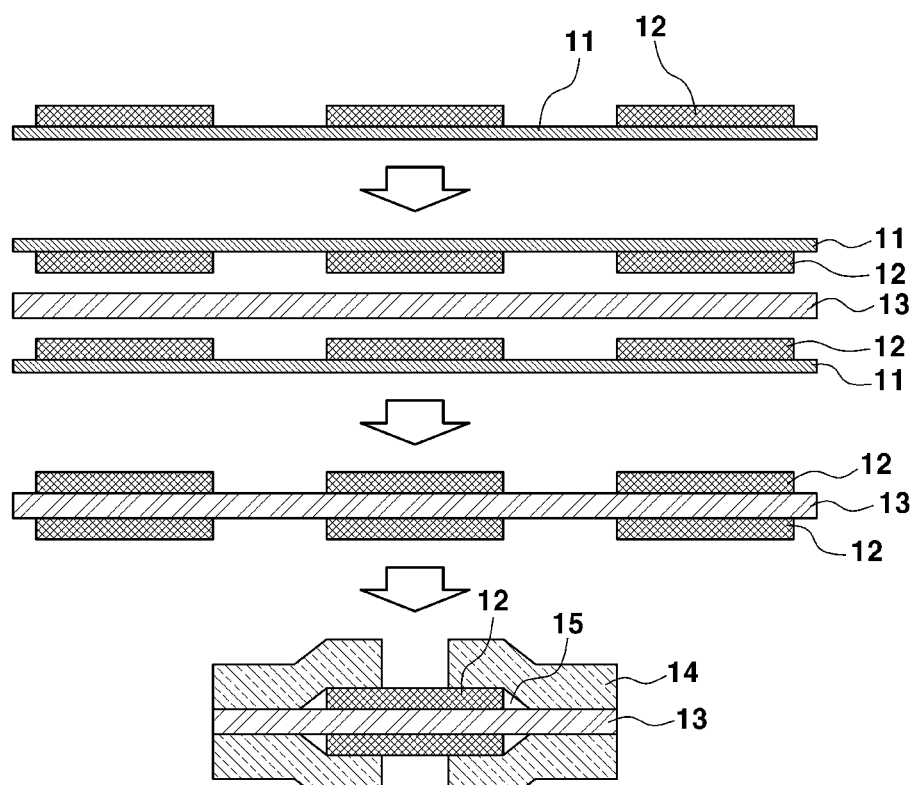
FIG. 1 shows a process of manufacturing a conventional membrane electrode assembly.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The above and other objects, features and advantages of the invention will become apparent with reference to embodiments described below in detail in conjunction with the accompanying drawings. The invention, however, is not limited to the embodiments disclosed hereinafter, and may be embodied in many different forms. Rather, these exemplary embodiments are provided so that this disclosure will be thorough and complete and will fully convey the scope of the invention to those skilled in the art.

In the drawings, the same or similar elements are denoted by the same reference numerals, and the dimensions of constituent elements are exaggerated for clarity. It will be understood that, although the terms "first," "second," etc. may be used herein to describe various elements, these elements should not be limited by these terms. These terms are only used to distinguish one element from another element. Thus, a first element may be termed a second element, and similarly, a second element may be termed a first element without departing from the scope of the invention. The expression of singularity includes a plural meaning unless the singular expression is explicitly different in context.

In the specification, the terms "comprising," "including," and "having" shall be understood to designate the presence of particular features, numbers, steps, operations, elements, parts, or combinations thereof but not to preclude the presence or addition of one or more other features, numbers, steps, operations, elements, parts, or combinations thereof. Further, it will be understood that, when an element such as a layer, film, region or substrate is referred to as being "on" or "under" another element, it can be "directly" on or under the other element or can be "indirectly" formed such that an intervening element is also present.

Unless otherwise indicated, all numbers, values and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

For example, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

Further, where a numerical range is disclosed herein, the range is continuous, and includes unless otherwise indicated, every value from the minimum value to and including the maximum value of the range. Still further, where such a range refers to integers, unless otherwise indicated, every integer from the minimum value to and including the maximum value is included.

In the context of this specification, where a range is stated for a parameter, it will be understood that the parameter includes all values within the stated range, inclusive of the stated endpoints of the range. For example, a range of "5 to 10" will be understood to include the values 5, 6, 7, 8, 9, and 10 as well as any sub-range within the stated range, such as to include the sub-range of 6 to 10, 7 to 10, 6 to 9, 7 to 9, etc., and inclusive of any value and range between the integers which is reasonable in the context of the range stated, such as 5.5, 6.5, 7.5, 5.5 to 8.5 and 6.5 to 9, etc. For example, a range of "10% to 30%" will be understood to include the values 10%, 11%, 12%, 13%, and all integers up to and including 30%, as well as any sub-range within the stated range, such as to include the sub-range of 10% to 15%, 12% to 18%, 20% to 30%, etc., and inclusive of any value and range between the integers which is reasonable in the context of the range stated, such as 10.5%, 15.5%, 25.5%, etc.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In one aspect, provided are a method of manufacturing a planar membrane electrode assembly for a fuel cell and a planar membrane electrode assembly for a fuel cell manufactured using the same. In particular, the planar membrane electrode assembly for a fuel cell according to various exemplary embodiments of the present invention may be manufactured such that an ionomer membrane is formed on both side surfaces of an electrode and between the electrode and an electrolyte membrane, thereby increasing interfacial bonding force between the electrode and the electrolyte membrane and improving the durability of a cell. In addition, the planar membrane electrode assembly may be manufactured such that both surfaces thereof are flat, it may be possible to prevent the formation of voids or surface steps between an electrode and a sub-gasket, thereby improving airtightness and preventing deterioration attributable to concentration of pressure.

Hereinafter, the steps of a method of manufacturing a planar membrane electrode assembly 100 for a fuel cell according to Embodiments 1 and 2 of the present invention will be described in detail with reference to the drawings.

Embodiment 1

Figure 2:
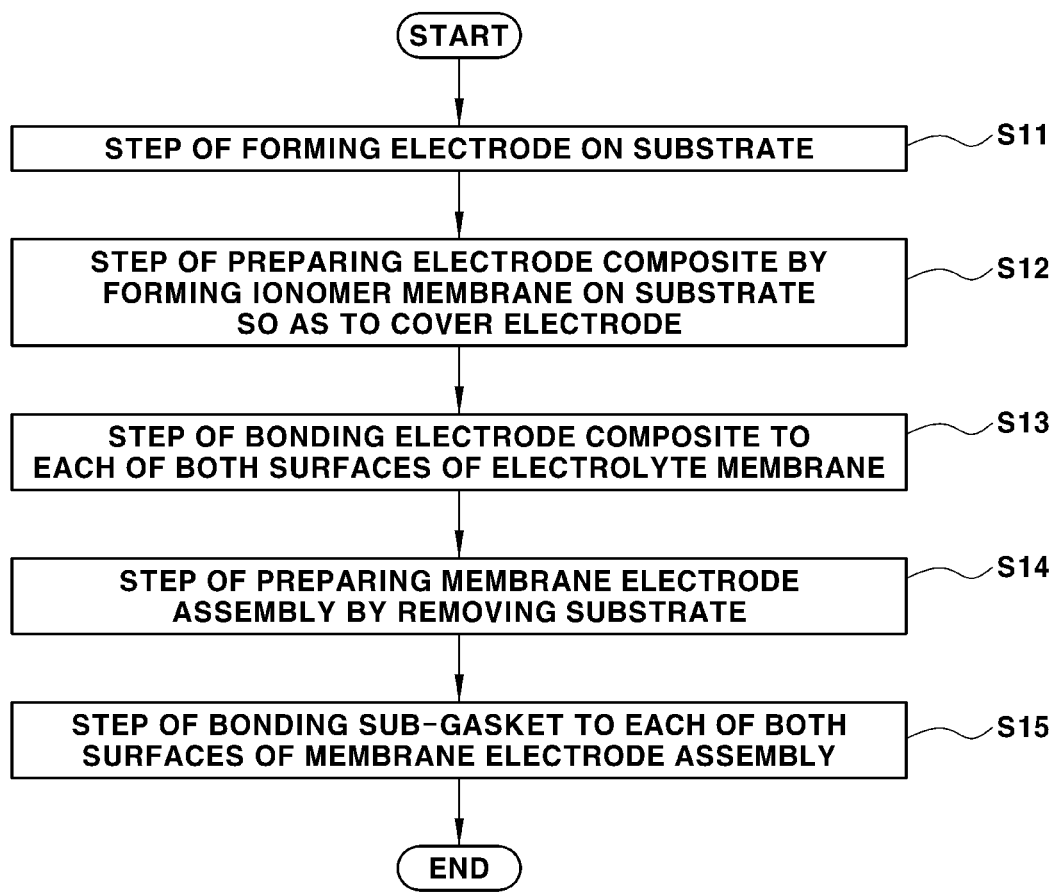
FIG. 2 shows an exemplary method of manufacturing a membrane electrode assembly in Embodiment 1 according to an exemplary embodiment of the present invention.

FIG. 2 shows an exemplary method of manufacturing the membrane electrode assembly 100 in Embodiment 1 according to an exemplary embodiment of the present invention. The method of manufacturing the membrane electrode assembly 100 may include a step of forming an electrode 120 on a substrate 110 (S11), a step of preparing an electrode composite by forming an ionomer membrane on the substrate 110 so as to cover the electrode 120 (S12), a step of stacking and bonding the electrode composite to each of surfaces of an electrolyte membrane 150 (S13), a step of preparing a membrane electrode assembly 100 by removing the substrate 110 (S14), and a step of bonding a sub-gasket 170 to each of both surfaces of the membrane electrode assembly 100 (S15).

Figure 3:
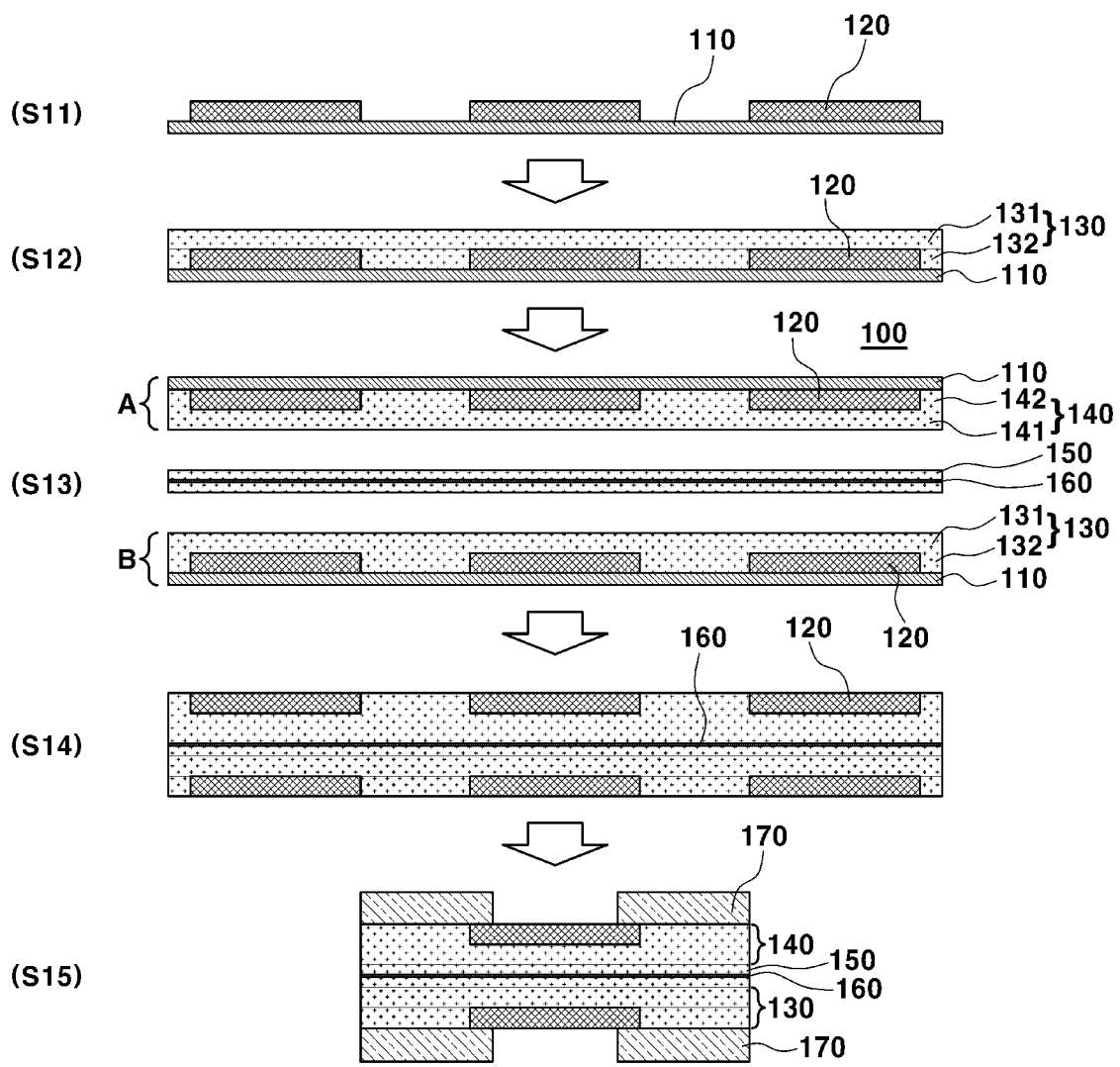
FIG. 3 shows an exemplary process of manufacturing the membrane electrode assembly in Embodiment 1 according to an exemplary embodiment of the present invention.

FIG. 3 shows an exemplary process of manufacturing the membrane electrode assembly 100 in Embodiment 1 according to an exemplary embodiment of the present invention.

As shown in FIGS. 2 and 3, the method of manufacturing the planar membrane electrode assembly 100 for a fuel cell may include a step of forming a plurality of electrodes 120 on a substrate 110 so as to be spaced apart from each other at a predetermined interval, a step of preparing an electrode composite by forming an ionomer membrane on the substrate 110 so as to fill the space between the electrodes 120 and to cover the electrodes 120, a step of stacking and bonding the electrode composite onto each of both surfaces (e.g., first and second surfaces which are opposing to each other) of an electrolyte membrane 150 so that the electrolyte membrane 150 and the ionomer membrane come into contact with each other, a step of preparing a membrane electrode assembly 100 by removing the substrate 110, and a step of bonding a sub-gasket 170 to each of surfaces of the membrane electrode assembly 100 so as to cover the edges of the electrodes 120 and the ionomer membrane.

1) Step of Forming Electrode 120 on Substrate 110 (S11)

The step S11 may include forming a plurality of electrodes 120 on the substrate 110 so as to be spaced apart from each other at a predetermined interval. Preferably, the predetermined interval may range from about 200 mm to about 300 mm. The substrate 110 may include one or more selected from the group consisting of polyethylene terephthalate, polyethylene naphthalate, and polyimide. In the step S11, when a liquid electrode is directly coated on the solid electrolyte membrane 150, an organic solvent in the liquid electrode may damage the electrolyte membrane 150 by dissolving or deforming the same. According to an exemplary embodiment, a liquid electrode may be first coated on the substrate 110 using a fixed-quantity discharge device, and may be then dried in a nitrogen atmosphere, thereby forming a solid-phase electrode 120 and preventing damages by the organic solvent.

Subsequently, as will be described later, the electrode 120 formed on the substrate 110 may be stacked on each of both surfaces (e.g., first and second surfaces which are opposing to each other) of the electrolyte membrane 150, and may be then bonded thereto through a Decal process using thermo-compression bonding.

A plurality of electrodes 120 may be formed on the substrate 110 so as to be spaced apart from each other at a predetermined interval. The electrodes 120 may include an anode and a cathode.

2) Step of Preparing Electrode Composite by Forming Ionomer Membrane on Substrate 110 so as to Cover Electrode 120 (S12)

The step S12 may include preparing an electrode composite by forming an ionomer membrane on the substrate 110 and on the electrode so as to fill the space between the electrodes 120 and to cover the electrodes 120. Preferably, an ionomer membrane may be formed to have a predetermined thickness, and a liquid-phase ionomer solution may be coated on the substrate 110, on which the electrodes 120 have been formed, using a fixed-quantity discharge device and a blade.

This ionomer membrane may be formed by applying an ionomer solution onto the substrate 110. The ionomer solution may suitably have a solid content of about 10 to 50% by weight and a viscosity of about 10 to 50 cP at a temperature of about 25° C. When the solid content of the ionomer solution is less than about 10% by weight, the viscosity of the solution may be lower than the optimum viscosity. When the solid content is greater than about 50% by weight, the viscosity of the solution may be greater than the optimum viscosity. When the viscosity of the ionomer solution is less than about 10 cP, the ionomer solution applied on the electrode 120 and the substrate 110 may flow down due to the low viscosity, or drying process may take longer. When the viscosity is greater than about 50 cP, it may be difficult to form an ionomer membrane having a certain thickness due to the high viscosity, and bubbles may be generated during the application process.

The ionomer solution may use the same ionomer as that used for forming the electrolyte membrane 150. For instance, the ionomer solution may suitably include a perfluorinated sulfonic acid polymer and an organic solvent. The perfluorinated sulfonic acid polymer may include a sulfonic acid group (—$SO_3H$) as a functional group, and thus may have a hydrogen ion exchange property. The organic solvent may suitably include one or more polar solvent, and exemplary organic solvent may suitably include one or more selected from among ethanol, and distilled water (DI water). The ionomer solution may be prepared by dispersing the perfluorinated sulfonic acid polymer in the organic solvent.

When the ionomer solution is coated on the electrode 120, the ionomer deeply may penetrate the microscopic surface of the electrode 120, such that the contact area between the electrode 120 and the electrolyte membrane 150 may increase, and the interfacial bonding force therebetween may increase. Further, since the ionomer solution uses the same components as the electrolyte membrane 150, the bonding force between the ionomer membrane and the electrolyte membrane 150 may be substantially increased.

A second ionomer membrane 132 may be formed in a manner such that the space between the electrodes 120 may be coated with an ionomer solution including an ionomer having various functions. However, the present invention is not limited thereto. For example, a polymer membrane may be formed instead of the second ionomer membrane. The polymer membrane may include a polymer. The polymer may suitably include epoxy, urethane, or a mixture thereof, and may have low oxygen and hydrogen permeability to provide improved water resistance, chemical resistance, and mechanical properties. When only the space between the electrodes 120 is coated with the ionomer solution or the polymer, the permeation of oxygen and hydrogen may be suppressed at both side edges of the electrodes 120, and the efficiency of using hydrogen between the electrodes 120 may be increased, thereby improving cell efficiency, enhancing mechanical properties and chemical resistance, and consequently increasing durability.

The ionomer membrane may be formed by applying an ionomer solution onto the substrate 110, drying the ionomer solution at a temperature of about 80° C. for about 5 to 30 minutes, and thermally treating the ionomer solution at a temperature of about 160° C. for about 5 to 30 minutes. When the drying temperature is less than about 80° C., the ionomer solution may not be completely dried, and thus the ionomer membrane may not be formed properly.

The electrode composite prepared in the step S12, as shown in "S12" in FIG. 3, may be formed such that a second ionomer membrane 132 may be formed in the space between the electrodes 120, which are spaced apart from each other at a predetermined interval on the substrate 110. The second ionomer membrane 132 may be disposed in the same layer as the electrodes 120 in order to prevent the formation of surface steps between the electrodes 120 and the electrolyte membrane 150 and to disperse pressure. A first ionomer membrane 131, having a greater surface area than the electrodes 120, may be formed on the electrodes 120 and on the second ionomer membrane 132. The first ionomer membrane 131 may improve the interfacial bonding force between the electrodes 120 and the electrolyte membrane 150 together with the second ionomer membrane 132.

3) Step of Bonding Electrode Composite to Each of Both Surfaces of Electrolyte Membrane 150 (S13)

The step S13 may include bonding the electrode composite to each of both surfaces (e.g., first and second surfaces which are opposing to each other) of the electrolyte membrane 150 so that the electrolyte membrane 150 and the ionomer membrane contact each other. The electrodes 120 of the electrode composite may include an anode and a cathode.

As shown in "S13" in FIG. 3, two electrode composites respectively from the anode and the cathode may be aligned, with the electrolyte membrane 150 interposed therebetween. At this time, the ionomer membrane may come into contact with the electrolyte membrane 150, and may be subjected to thermocompression bonding so as to be stacked on the electrolyte membrane 150. In FIG. 3, "A" may be an electrode composite for a cathode, and "B" may be an electrode composite for an anode.

The electrolyte membrane 150 may include a reinforcing layer 160 and an ionomer impregnated in the reinforcing layer 160. The reinforcing layer 160 may suitably include a fluorinated polymer such as expanded polytetrafluoroethylene (e-PTFE), and may have a thickness of about 1 to 5 μm. In particular, the expanded polytetrafluoroethylene may improve mechanical properties such as tensile strength and elongation rate, thus compensating for the insufficient mechanical properties of the electrolyte membrane 150.

In addition, the reinforcing layer 160 may include expanded polymer resin, and the ionomer may be impregnated in expanded pores, with the result that the electrolyte membrane 150 may be formed so as to have improved mechanical properties while maintaining a hydrogen ion exchange property. Preferably, the ionomer may include a perfluorinated sulfonic acid ionomer. In the step S13, the bonding may be thermocompression bonding using a roll press machine heated to a temperature of about 80 to 120° C.

4) Step of Preparing Membrane Electrode Assembly 100 by Removing Substrate 110 (S14)

The step S14 may include removing the substrate 110 before bonding a sub-gasket 170 to the membrane electrode assembly 100. The electrodes 120 of the membrane electrode assembly 100, from which the substrate 110 has been removed, may include an anode and a cathode, which are disposed opposite each other, with the electrolyte membrane 150 interposed therebetween. At this time, since the anode has a greater reaction rate than the cathode, the anode may have a less catalyst content and a less thickness. For example, the anode may suitably have a thickness of about 1 to 5 μm. When the thickness of the anode is less than about 1 μm, the amount of the carbon carrier may be reduced, leading to deterioration in durability attributable to corrosion. When the thickness of the anode is greater than about 5 μm, excessive catalyst may be needlessly loaded, leading to an increase in costs. The cathode may suitably have a thickness of about 5 to 15 μm. When the thickness of the cathode is less than about 5 μm, the catalyst content may be reduced, leading to performance degradation. When the thickness of the cathode is greater than about 15 μm, excessive catalyst may be needlessly loaded, leading to an increase in costs.

The ionomer membrane formed on the electrodes 120 may have a thickness greater than about than a thickness of the electrodes 120. The ionomer membrane must be formed so as to completely cover the electrodes 120 while filling the space between the electrodes 120. Accordingly, interfacial bonding force between the electrodes 120 and the electrolyte membrane 150 may be increased and the formation of voids or surface steps between the electrodes 120 and the sub-gasket 170 may be prevented. The ionomer membrane 130 formed at the anode side may have a thickness of about 2 to 8 μm. When the thickness of the ionomer membrane 130 formed at the anode side is less than about 2 μm, the anode may not be completely covered, failing to increase interfacial bonding force between the electrodes and the electrolyte membrane and to prevent the formation of voids or surface steps. When the thickness of the ionomer membrane 130 formed at the anode side is greater than about 8 μm, ion conductivity between the anode and the cathode across the ionomer membrane may be deteriorated, leading to degradation of the performance of the membrane electrode assembly.

The ionomer membrane 140 formed at the cathode side may suitably have a thickness of about 6 to 18 µm. Similar to the ionomer membrane 130 formed at the anode side, the ionomer membrane 140 may be formed so as to completely cover the cathode in order to increase interfacial bonding force between the electrodes 120 and the electrolyte membrane 150 and to prevent the formation of voids or surface steps between the electrodes 120 and the sub-gasket 170. When the thickness of the ionomer membrane 140 formed at the cathode side is less than about 6 µm, the cathode may not be completely covered, thereby failing to increase interfacial bonding force between the electrodes and the electrolyte membrane and to prevent the formation of voids or surface steps. When the thickness of the ionomer membrane 140 formed at the cathode side is greater than about 18 µm, ion conductivity between the anode and the cathode across the ionomer membrane may be deteriorated, causing degradation of the performance of the membrane electrode assembly.

Each of both surfaces of the membrane electrode assembly 100, from which the substrate 110 has been removed, may have a planar-shaped structure in which the plurality of electrodes 120 is embedded in the ionomer membrane unlike the conventional membrane electrode assembly. Accordingly, even when the sub-gasket 170 is bonded to each of both surfaces of the membrane electrode assembly 100, pressure may not be concentrated on a particular point or uneven points due to the flat surface, thereby preventing deterioration attributable to local concentration of pressure.

5) Step of Bonding Sub-Gasket 170 to Each of Both Surfaces of Membrane Electrode Assembly 100 (S15)

The step S15 may include bonding a sub-gasket 170 to each of both surfaces of the membrane electrode assembly 100 so as to cover the edges of the electrodes 120 and the ionomer membrane. As shown in "S15" in FIG. 3, the sub-gasket 170 may be bonded to the membrane electrode assembly 100 so as to cover a portion of the edge of each of the electrodes 120 and the ionomer membrane. Even when the sub-gasket 170 is bonded to the membrane electrode assembly 100, void formation may be avoided. Therefore, damage attributable to deterioration in airtightness or deformation of the shape of the membrane electrode assembly 100 may be sufficiently prevented. The planar membrane electrode assembly 100 for a fuel cell in Embodiment 1 may be mass-produced through the above-described continuous process.

Meanwhile, the planar membrane electrode assembly 100 for a fuel cell according to an exemplary embodiment of the present invention includes: an anode composite, which includes an anode, a first ionomer membrane 131 interposed between the anode and an electrolyte membrane 150 and having a surface area greater than the anode, and a second ionomer membrane 132 located in the same layer as the anode and filling a space formed by the anode and the first ionomer membrane 131; a cathode composite, which includes a cathode, a third ionomer membrane 141 interposed between the cathode and the electrolyte membrane 150 and having a surface area greater than the cathode, and a fourth ionomer membrane 142 located in the same layer as the cathode and filling a space formed by the cathode and the third ionomer membrane 141; and a gasket bonded to the edge of the anode, the second ionomer membrane 132, the edge of the cathode, and the fourth ionomer membrane 142. Preferably, the electrolyte membrane 150 may be interposed between the anode composite and the cathode composite.

Figure 4:
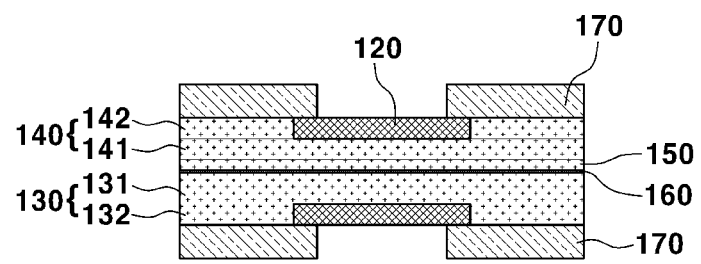
FIG. 4 shows a sectional view of an exemplary membrane electrode assembly in Embodiment 1 according to an exemplary embodiment of the present invention.

FIG. 4 shows a sectional view of an exemplary membrane electrode assembly 100 in Embodiment 1 according to an exemplary embodiment of the present invention. As shown in FIG. 4, the electrodes 120 may be disposed opposite each other, with the electrolyte membrane 150 interposed therebetween. The electrodes 120 may include an anode (lower side) and a cathode (upper side). The first ionomer membrane 131 may be formed between the anode and the electrolyte membrane 150, and the second ionomer membrane 132 may be formed around the anode in the same layer as the anode. Similarly, the cathode may include a third ionomer membrane 141 formed between the cathode and the electrolyte membrane 150, and a fourth ionomer membrane 142 formed around the cathode. Each of the first, second, third and fourth ionomer membranes 131, 132, 141 and 142 may include a perfluorinated sulfonic acid ionomer.

The electrolyte membrane 150 may be a reinforcing layer 160, or may include a reinforcing layer 160 and an ionomer impregnated in the reinforcing layer 160. The reinforcing layer 160 may suitably include expanded polytetrafluoroethylene (e-PTFE). FIG. 4 shows the electrolyte membrane 150 including the reinforcing layer 160 impregnated with an ionomer. The ionomer contained in the electrolyte membrane 150 may be the same as that used for the first to fourth ionomer membranes.

The anode may suitably have a thickness of about 1 to 5 µm, and the cathode may suitably have a thickness of about 5 to 15 µm. Each of the first and third ionomer membranes 131 and 141 may suitably have a thickness of about 1 to 3 µm. As shown in FIG. 4, the second ionomer membrane 132 formed at the anode side may suitably have a thickness of about 1 to 5 µm, which may be equal to the thickness of the anode. The thickness of the first ionomer membrane 131 from the electrolyte membrane 150 to the anode may suitably be about 1 to 3 µm. The fourth ionomer membrane 142 formed at the cathode side may have a thickness of about 5 to 15 µm, which may be equal to the thickness of the cathode. The thickness of the third ionomer membrane 141 from the electrolyte membrane 150 to the cathode may suitably be about 1 to 3 µm.

Embodiment 2

Figure 5:
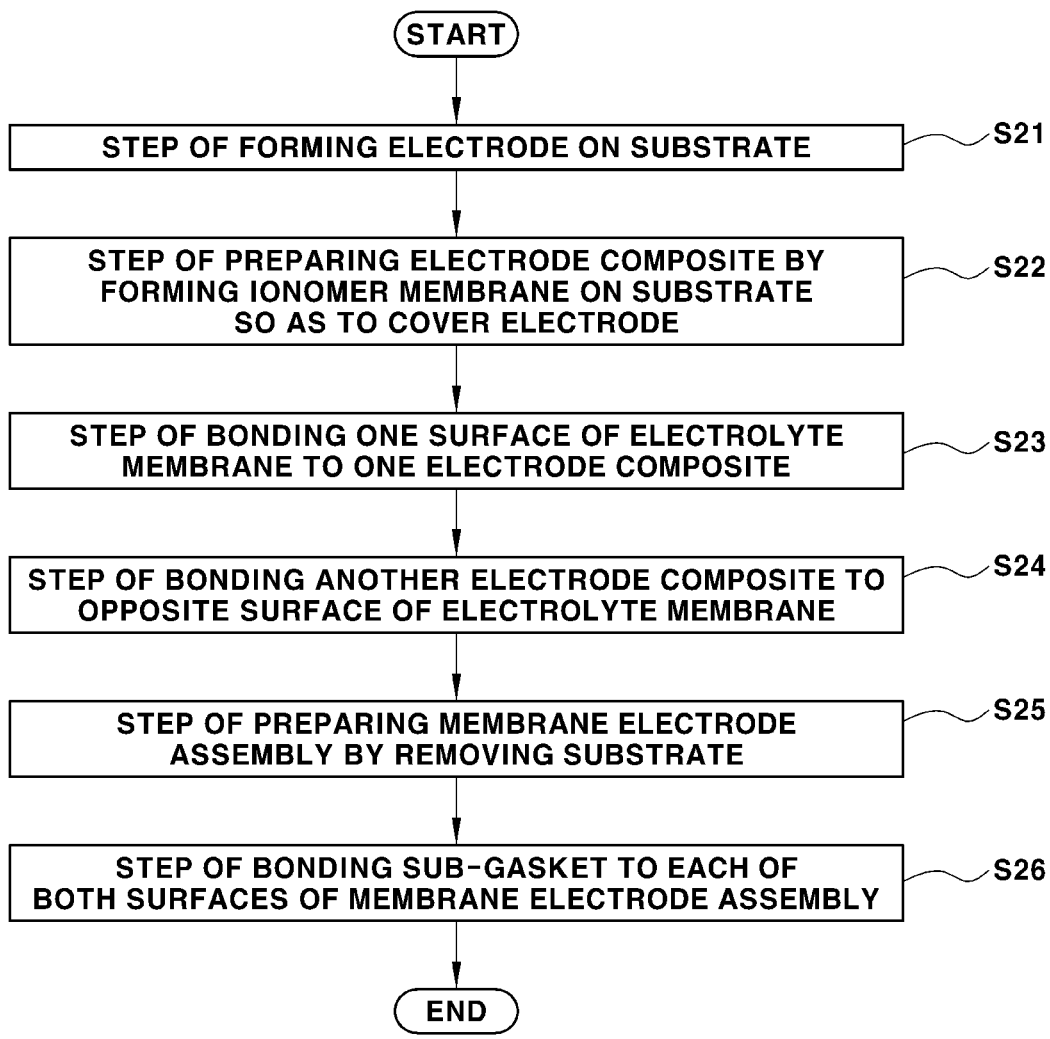
FIG. 5 shows an exemplary method of manufacturing an exemplary membrane electrode assembly in Embodiment 2 according to an exemplary embodiment of the present invention.

FIG. 5 shows an exemplary method of manufacturing an exemplary membrane electrode assembly in Embodiment 2 according to an exemplary of the present invention. For example, the manufacturing method may include a step of forming an electrode 120 on a substrate 110 (S21), a step of preparing a first electrode composite by forming an ionomer membrane on the substrate 110 so as to cover the electrode 120 (S22), a step of bonding a first surface of an electrolyte membrane 150 to a first electrode composite (S23), a step of bonding a second electrode composite to the second surface of the electrolyte membrane 150 (S24), a step of preparing a membrane electrode assembly by removing the substrate 110 (S25), and a step of bonding a sub-gasket 170 to each of both surfaces of the membrane electrode assembly (S26). The first and the second surfaces of the electrode composite may be opposing surfaces.

Figure 6:
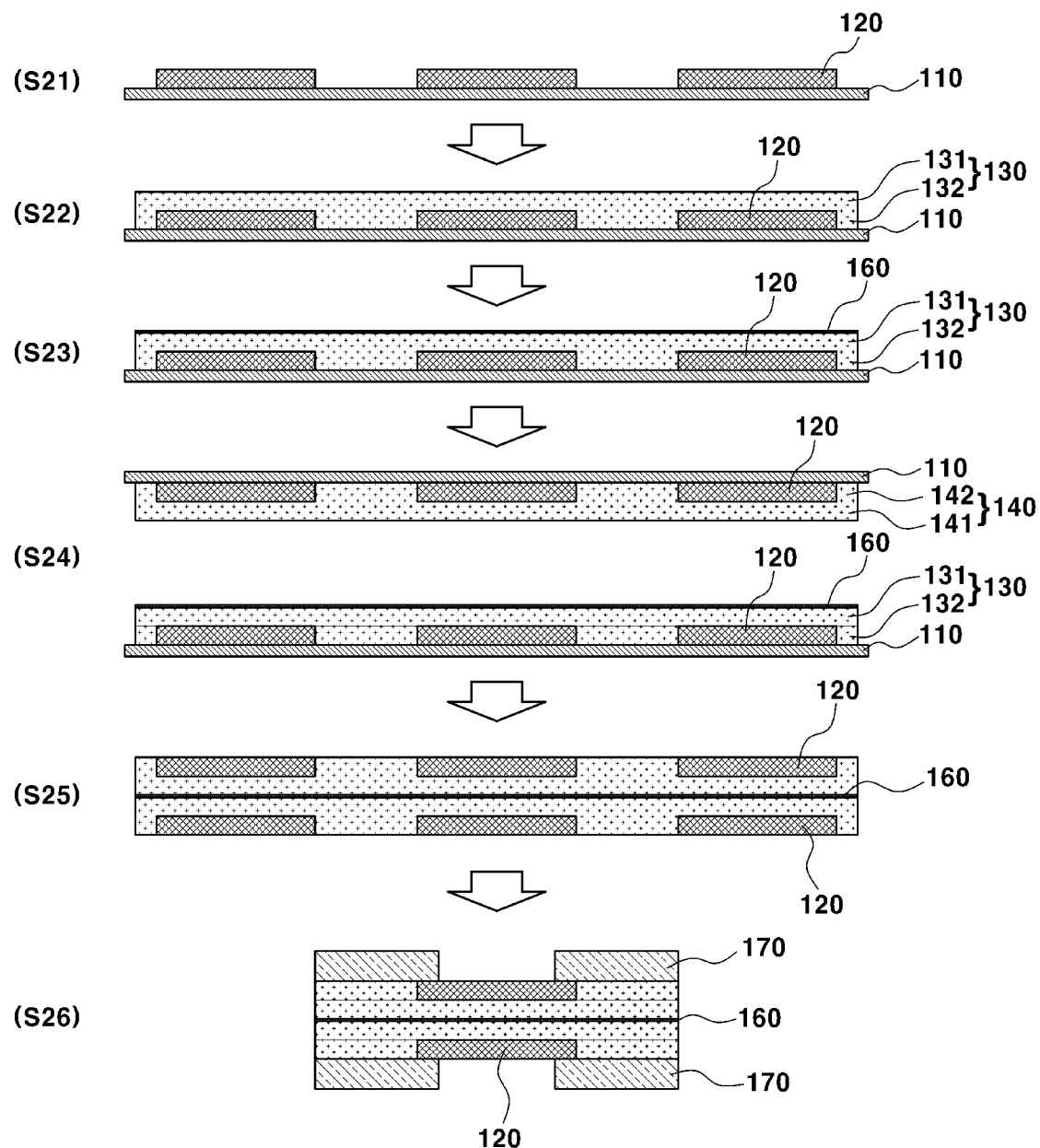
FIG. 6 shows an exemplary process of manufacturing an exemplary membrane electrode assembly in Embodiment 2 according to an exemplary embodiment of the present invention.

FIG. 6 shows an exemplary process of manufacturing an exemplary membrane electrode assembly in Embodiment 2 according to an exemplary embodiment of the present invention.

As shown in FIGS. 5 and 6, the method of manufacturing the planar membrane electrode assembly for a fuel cell may include a step of forming a plurality of electrodes 120 on a substrate 110 so as to be spaced apart from each other at a predetermined interval, a step of preparing an electrode composite by forming an ionomer membrane on the substrate 110 and on the plurality of the electrode so as to fill the space between the electrodes 120 and to cover the electrodes 120, a step of bonding a first surface of an electrolyte membrane 150 to one electrode composite (e.g., first electrode composite) so that the ionomer membrane of the electrode composite and the first surface of the electrolyte membrane 150 contact each other, a step of stacking and bonding another electrode composite (e.g., second electrode composite) onto the opposite surface of the electrolyte membrane 150 so that the ionomer membrane of the electrode composite and the opposite surface of the electrolyte membrane 150 contact each other, a step of preparing a membrane electrode assembly by removing the substrate 110, and a step of bonding a sub-gasket 170 to each of surfaces of the membrane electrode assembly so as to cover the edges of the electrodes 120 and the ionomer membrane.

Except for the steps S23 and S24, the steps S21, S22, S25 and S26 in the method of manufacturing the planar membrane electrode assembly for a fuel cell according to Embodiment 2 may be the same as the steps S11, S12, S14 and S15 in Embodiment 1. Hereinafter, an explanation of the same steps as those in Embodiment 1 will be omitted, and an explanation of the steps S23 and S24 in Embodiment 2 will be made in detail with reference to the drawings.

1) Step of Bonding One Surface of Electrolyte Membrane 150 to One Electrode Composite (S23)

The step S23 may include bonding a first surface of an electrolyte membrane 150 to one electrode composite so that the ionomer membrane of the electrode composite and the first surface of the electrolyte membrane 150 contact each other. When the electrolyte membrane 150 is bonded to the ionomer membrane in the step S23 shortly after the ionomer membrane has been formed in the previous step, the ionomer may permeate the electrolyte membrane 150 due to a capillarity effect, thereby obtaining an effect in which the electrolyte membrane 150 may be directly formed on the electrodes 120.

The electrolyte membrane 150 may be a reinforcing layer 160. The reinforcing layer 160 may suitably include expanded polytetrafluoroethylene (e-PTFE) so that the ionomer may be impregnated into pores in the reinforcing layer 160. The reinforcing layer 160 may have a thickness of 1 to 5 µm. When the thickness of the reinforcing layer 160 is less than about 1 µm, the effect of enhancing mechanical properties may not be sufficient. When the thickness of the reinforcing layer 160 is greater than about 5 µm, the ionomer may not be sufficiently impregnated into the reinforcing layer 160, or the overall thickness of the electrolyte membrane may become large, and thus ion conductivity may be reduced.

2) Step of Bonding Another Electrode Composite to Opposite Surface of Electrolyte Membrane 150 (S24)

The step S24 may include stacking and bonding another electrode composite onto the second surface of the electrolyte membrane 150 so that the ionomer membrane of the electrode composite and the opposite surface of the electrolyte membrane 150 contact each other. Preferably, the two electrode composites may be bonded to both surfaces of the electrolyte membrane 150 such that the electrodes 120 of the two electrode composites may be aligned opposite each other. When the membrane electrode assembly is manufactured through the above steps S23 and S24, it is not necessary to separately form the electrolyte membrane 150 including the reinforcing layer 160 impregnated with an ionomer, as in Embodiment 1, thereby shortening the process time. In the step of stacking and bonding another electrode composite onto the second surface of the electrolyte membrane, the bonding may be thermocompression bonding using a roll press machine heated to a temperature of about 80 to 120° C.

As is apparent from the above description, the present invention has the following effects.

A planar membrane electrode assembly for a fuel cell according to the present invention may be manufactured such that an ionomer membrane may be formed on both side surfaces of an electrode and between the electrode and an electrolyte membrane, thereby increasing interfacial bonding force between the electrode and the electrolyte membrane and improving the durability of a cell.

In addition, since the planar membrane electrode assembly is manufactured such that both surfaces thereof are flat, it may be possible to prevent the formation of voids or surface steps between an electrode and a sub-gasket, thereby improving airtightness and preventing deterioration attributable to concentration of pressure.

It will be appreciated by those skilled in the art that the effects achievable through the invention are not limited to those that have been particularly described hereinabove, and other effects of the invention will be more clearly understood from the above detailed description.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly for a fuel cell, comprising:
   forming a plurality of electrodes on a substrate so as to be spaced apart from each other at a predetermined interval;
   preparing two electrode composites, each of the electrode composites comprising an ionomer membrane formed on the substrate and the plurality of electrodes so as to fill a space between the electrodes and to cover the electrodes;
   stacking and bonding the electrode composites onto a first surface and a second surface of an electrolyte membrane so that the electrolyte membrane and the ionomer membrane of the each of the electrode composites contact each other;
   preparing a membrane electrode assembly by removing the substrate; and
   bonding a sub-gasket to the first and second surfaces of the membrane electrode assembly so as to cover edges of the electrodes and the ionomer membrane,
   wherein the ionomer membrane is formed by applying an ionomer solution onto the substrate, and drying the ionomer solution, and
   wherein the two electrode composites are bonded to the electrolyte membrane by performing thermocompression bonding using a roll press machine heated.

2. A method of manufacturing a membrane electrode assembly for a fuel cell, comprising:
   forming a plurality of electrodes on a substrate so as to be spaced apart from each other at a predetermined interval;
   preparing a first electrode composite and a second electrode composite, each comprising an ionomer membrane formed on the substrate and the plurality of electrodes so as to fill a space between the electrodes and to cover the electrodes;

bonding a first surface of an electrolyte membrane to the first electrode composite so that the ionomer membrane of the first electrode composite and the first surface of the electrolyte membrane contact each other;

stacking and bonding the second electrode composite onto a second surface of the electrolyte membrane so that the ionomer membrane of the second electrode composite and the second surface of the electrolyte membrane contact each other;

preparing a membrane electrode assembly by removing the substrate; and bonding a sub-gasket to each of the first and second surfaces of the membrane electrode assembly so as to cover edges of the electrodes and the ionomer membrane, wherein the ionomer membrane is formed by applying an ionomer solution onto the substrate, and drying the ionomer solution, and wherein the second electrode composite is bonded to the second surface of the electrolyte membrane by performing thermocompression bonding using a roll press machine heated.

3. The method of claim 1, wherein the substrate comprises one or more selected from the group consisting of polyethylene terephthalate, polyethylene naphthalate, and polyimide.

4. The method of claim 1, wherein the electrode composites are bonded to the electrolyte membrane by performing thermocompression bonding using a roll press machine heated to a temperature of about 80 to 120° C.

5. The method of claim 2, wherein the second electrode composite is bonded to the second surface of the electrolyte membrane by performing thermocompression bonding using a roll press machine heated to a temperature of about 80 to 120° C.

6. The method of claim 1, wherein the plurality of electrodes of the membrane electrode assembly comprise an anode and a cathode that are disposed on the different electrode composites such that the electrolyte membrane is interposed between the anode and the cathode, and wherein the anode has a thickness of about 1 to 5 μm, and the cathode has a thickness of about 5 to 15 μm.

7. The method of claim 1, wherein the ionomer solution has a solid content of about 10 to 50% by weight and a viscosity of about 10 to 50 cP at a temperature of about 25° C.

8. The method of claim 7, wherein the ionomer solution comprises a perfluorinated sulfonic acid polymer and an organic solvent.

9. The method of claim 1, wherein the ionomer membrane is formed by applying an ionomer solution onto the substrate, drying the ionomer solution at a temperature of about 80° C. for about 5 to 30 minutes, and thermally treating the ionomer solution at a temperature of about 160° C. for about 5 to 30 minutes.

10. The method of claim 6, wherein the ionomer membrane formed on the plurality of the electrodes has a thickness greater than a thickness of each of the plurality of the electrodes.

11. The method of claim 10, wherein the ionomer membrane formed on the anode has a thickness of about 2 to 8 μm, and the ionomer membrane formed on the cathode has a thickness of about 6 to 18 μm.

12. The method of claim 1, wherein the electrolyte membrane comprises a reinforcing layer and an ionomer impregnated in the reinforcing layer.

13. The method of claim 2, wherein the electrolyte membrane is a reinforcing layer.

14. The method of claim 12, wherein the reinforcing layer comprises expanded polytetrafluoroethylene (e-PTFE).

15. The method of claim 1, wherein after the substrate is removed, each of both surfaces of the membrane electrode assembly has a planar-shaped structure by embedding the plurality of the electrodes and filling the space between the plurality of the electrodes with the ionomer membrane.

16. A membrane electrode assembly for a fuel cell comprising:

an anode composite comprising an anode, a first ionomer membrane interposed between the anode and an electrolyte membrane and having a greater surface area than a surface area of the anode, and a second ionomer membrane located in a same layer as the anode and filling a space formed by the anode and the first ionomer membrane;

a cathode composite comprising a cathode, a third ionomer membrane interposed between the cathode and the electrolyte membrane and having a greater surface area than a surface area of the cathode, and a fourth ionomer membrane located in a same layer as the cathode and filling a space formed by the cathode and the third ionomer membrane, wherein the electrolyte membrane is interposed between the anode composite and the cathode composite; and a gasket bonded to an edge of the anode, the second ionomer membrane, an edge of the cathode, and the fourth ionomer membrane.

17. The membrane electrode assembly of claim 16, wherein the electrolyte membrane comprises a reinforcing layer which is optionally impregnated with an ionomer.

18. The membrane electrode assembly of claim 16, wherein the reinforcing layer has a thickness of 1 to 5 μm.

19. The membrane electrode assembly of claim 16, wherein the anode has a thickness of about 1 to 5 μm, and the cathode has a thickness of about 5 to 15 μm.

20. The membrane electrode assembly of claim 16, wherein each of the first ionomer membrane and the third ionomer membrane has a thickness of about 1 to 3 μm.

* * * * *